US011908435B2

(12) United States Patent
Cooke

(10) Patent No.: US 11,908,435 B2
(45) **Date of Patent: *Feb. 20, 2024**

(54) PERCUSSION MUSICAL INSTRUMENTS FOR OUTDOOR INSTALLATION

(71) Applicant: Playcore Wisconsin, Inc, Chattanooga, TN (US)

(72) Inventor: Richard Cooke, Hasperus, CO (US)

(73) Assignee: PLAYCORE WISCONSIN, INC., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,849

(22) Filed: Nov. 5, 2021

(65) Prior Publication Data

US 2022/0172696 A1 Jun. 2, 2022

Related U.S. Application Data

(63) Continuation of application No. 16/221,009, filed on Dec. 14, 2018, now Pat. No. 11,200,873.

(60) Provisional application No. 62/599,366, filed on Dec. 15, 2017.

(51) Int. Cl.
*G10D 13/08* (2020.01)

(52) U.S. Cl.
CPC .................................. *G10D 13/08* (2013.01)

(58) Field of Classification Search
CPC ............................... G10D 13/08; G10D 13/00
See application file for complete search history.

(56) References Cited

U.S. PATENT DOCUMENTS

2017/0110100 A1* 4/2017 Keller ................... G10D 13/22

OTHER PUBLICATIONS

Https://soundofdragon.com/percussion-list/ ; Bernard; Year is 2016.*

* cited by examiner

*Primary Examiner* — Kimberly R Lockett
(74) *Attorney, Agent, or Firm* — McAndrews, Held & Malloy, Ltd.

(57) ABSTRACT

Percussion instruments configured for outdoor installation are disclosed. The percussion instrument comprises a support post, wherein the support post is configured for attachment to an outdoor surface, a mounting base secured to the support post, one or more metal discs, wherein each metal disc is tuned to produce a note on a musical scale when struck by a user, and one or more fasteners securing the one or more metal discs to the mounting base.

20 Claims, 3 Drawing Sheets

PERCUSSION MUSICAL INSTRUMENTS FOR OUTDOOR INSTALLATION

RELATED APPLICATIONS

This application is a continuation of U.S. application Ser. No. 16/221,009, filed Dec. 14, 2018 and claims priority to and benefit of U.S. provisional patent application No. 62/599,366, filed Dec. 15, 2017, which are herein incorporated by reference in its entireties.

BACKGROUND OF THE INVENTION

Music is a global, artistic language that creates community, connection and a sense of belonging. Some studies suggest that music is older than speech and language, and that speech may have even evolved from music. The primal power of music evokes emotions, memories, and images, taking the participant on a magical journey.

Research has shown that musical play is a key component of development in children. Music helps to build reasoning skills and cognitive development. It can increase the capacity of one's memory, refine time management and organizational skills, and teach perseverance. Playing music builds confidence, encourages creativity and self-expression. It can reduce anxiety, relieve symptoms of depression, and elevate one's mood. The Brain and Creativity Institute found that musical experiences in childhood can accelerate brain development, particularly in the areas of language acquisition and reading skills.

Research has also shown that being outside enhances a child's development. Nature is important to children's development in every major way—intellectually, emotionally, socially, spiritually and physically. See, for example, Kellert, Stephen R., "Nature and Childhood Development," *In Building for Life: Designing and Understanding the Human-Nature Connection*, Island Press, 2005. For instance, "[e]xperience of the outdoors has the potential to confer a multitude of benefits on young people's physical development, emotional and mental health and well-being and societal development. Mental health and wellbeing benefits from play in natural settings appear to be long-term, realized in the form of emotional stability in young adulthood." Travlou, Penny, "Wild Adventure Space For Young People," *OPENspace Individual Literature Reviews* (2006).

As such, instruments placed in outdoor learning environments enable "children to explore natural sounds in the environment, make loud music, compose music individually and collaboratively, and move expressively." Spencer, Karin H, et al., Quality Outdoor Play Spaces for Young Children, *Young Children*, pp 28-34 (2014).

However, many outdoor instruments are atonal and traditional instruments are not constructed in a manner to withstand extreme outdoor conditions.

BRIEF SUMMARY OF THE INVENTION

Embodiments of the percussion instruments of the present disclosure comprise a support post configured to be mounted to an outdoor surface to extend from that surface and an instrument assembly which comprises a mounting base and at least one metal disc tuned to produce a musical note when struck by a user. Each metal disc may be secured to the mounting base by one or more fasteners, such as bolts. The instrument assembly may also comprise one or more elastomeric spacers, each elastomeric spacer surrounding one of the one or more fasteners. In some embodiments, the elastomeric spacers may span or substantially span between the metal disc and the mounting base. The instrument assembly, and in particular the mounting base, may be secured to the support post by one or more fasteners. Preferably, the instrument comprises a plurality of metal discs secured to the mounting base.

The instrument may also comprise one or more mallets that a user may use to strike the metal disc to produce the musical note. Each mallet may be attached to the instrument by a cable, which may be either a retractable cable or a non-retractable cable. In some embodiments, the cable is made from steel. In some embodiments, for instance, one or more mallets may be attached to a portion of the support post. In other embodiments, the one or more mallets may be attached to the instrument assembly, such as to the mounting base. In yet another embodiment, one or more mallets may be attached to an additional structure, such as a mallet-support structure. In some embodiments, the mallet(s) may be attached to the instrument or to the mallet-support structure through a tamper-resistance connection in order to protect against the removal of the mallet(s).

In some embodiments, the metal discs may be of varying sizes, each disk being independently tuned to produce a distinct musical note when struck by a user. In some embodiments, the instrument assembly may comprise at least four metal discs, alternatively at least five metal discs, alternatively at least six metal discs, alternatively at least seven metal discs, alternatively at least eight metal discs. For example, in some embodiments, the instrument assembly may comprise ten metal discs tuned to produce between seven and ten different musical notes. The metal discs may be located in different arrangements around the instrument assembly. In some embodiments, the plurality of metal discs may be mounted at varying heights above the mounting base. For instance, in some embodiments, the plurality of fasteners and/or the plurality of spacers may be of varying lengths.

In some embodiments, each metal disc may be configured to produce a distinct musical note by each metal disc comprising a different size, e.g., a different diameter. In some embodiments, the rear surface of each metal disc may also be milled, i.e., metal may be removed from the rear surface in a controlled manner to sharpen or flatten the note produced by the segment. In some embodiments, the notes produced by each metal disc may be from the same musical scale (e.g., C-major, etc.). Each note may desirably be at least 90% accurate (e.g., as measured by a tuner), more preferably at least 95% accurate, more preferably at least 98% accurate, more preferably at least 99% accurate.

In some embodiments, the percussion musical instrument may be configured to withstand prolonged outdoor use. For instance, the instruments are configured to endure various atmospheric states including, but not limited to, heat, cold, dryness, sunshine, wind, rain, and snow. For example, one or more of the components, such as the one or more metal discs the mounting base, the support post, the mallet(s), and/or any exposed connections may be resistant to water damage. In some embodiments, for example, the metal disc may be aluminum. In some embodiments, the mounting base may be slightly angled downward from the center toward the edges so that water flows off of the mounting base. In other embodiments, the mounting base may comprise one or more through holes that provide for water drainage. The support post may be steel including, but not limited to galvanized steel or stainless steel.

The instrument may also be configured to endure frequent hard play. The percussion musical instrument may be designed for durability and require minimal to no maintenance. Even with regular use, the metal discs may maintain their tonal quality with no need for re-tuning.

In additional to withstanding the stresses of outdoor installation, the percussion instrument may incorporate various features to promote a player's enjoyment and satisfaction. These features include: providing an ergonomic design that promotes ease of play, providing a combination of notes that sound good together (there being from the same musical scale), and configuring the instrument to achieve a sustained note or notes.

The ergonomic design of percussion instrument may be configured to allow for ease of play. By providing a large surface area to be struck by a player, the ability to consistently produce musical notes and to create melodies from those notes will either come naturally or is easily developed for people of all ages and skills. Moreover, in some embodiments, the instrument may be configured so that regardless of whether a player strikes the instrument in the middle of a metal disc or near the edge, the note may resonate in substantially the same manner. Additionally, each instrument may have at least one mallet that is easy to use and designed to produce the fullest sound from each note.

The percussion instrument may, in some embodiments, allow for a user to produce a combination of notes that work together—creating harmonious and complementary sounds. The different notes may be created by providing several metal discs, with each metal disc being configured to produce a distinct musical note. The different notes may all be part of the same musical scale, ensuring that the notes do not conflict with one another. This may facilitate the playing of pleasant and enjoyable sound combinations.

In some embodiments, the percussion instrument may be configured so that the musical note or notes may be sustained long after the striking of the metal disc. When notes are sustained longer, players can hear the harmonies that are created as they strike the different notes; they don't have to play fast. This makes it relatively easy for a user to create enjoyable melodies. Additionally, the experience may be more gratifying because the sound lasts longer. In some embodiments, for instance, the notes may be sustained for 5 seconds or longer, alternatively 10 seconds or longer, alternatively 15 seconds or longer, alternatively 20 seconds or longer, alternatively between about 5 seconds and about 20 seconds, alternatively between about 10 seconds and about 15 seconds, alternatively between about 10 seconds and about 20 seconds, alternatively between about 15 seconds and about 20 seconds.

Features of the percussion instrument may provide for individual and group play. For instance, using embodiments of the percussion instrument described herein, complex combinations of notes can be created by having multiple individuals play either a single instrument or multiple instruments positioned in proximity to one another at the same time—similar to the way various instruments in an orchestra come together to form one cohesive, beautiful piece of music.

The percussion instrument works by using a wide surface area of the vibrating element to radiate sound to the player, rather than using a tuned air cavity (resonator) to achieve an audible volume of tone. Additionally, it uses a support system for the vibrating element that is free of wire rope or similar tie down. In some embodiments, the percussion instrument comprises a bolt system for support of the metal discs, with additional cylindrical support tubes to keep the percussions level. Unlike drum kit percussions, which are thin and non-tonal, the percussion instrument comprises metal discs that are precisely tuned to specific musical tones.

In some embodiments, the percussion instrument comprises a support post, wherein the support post is configured for attachment to an outdoor surface, a mounting base secured to the support post, one or more metal discs, wherein each metal disc is tuned to produce a note on a musical scale when struck by a user, and one or more fasteners securing the one or more metal discs to the mounting base.

In some embodiments, the percussion instrument comprises a plurality of metal discs tuned to produce different notes on a musical scale. In a further embodiment, each metal disc has a different outside diameter. In yet a further embodiment, a rear surface of each metal disc is independently milled to provide each note. In a still further embodiment, the different notes are within the same musical scale.

In some embodiments, the metal disc comprises aluminum. In yet another embodiment, the metal disc is aluminum.

In some embodiments, the metal disc has a note accuracy of at least 90%. In another embodiment, the note is sustained for at least 5 seconds when the metal disc is struck by a user. In yet another embodiment, the note is sustained for between 10 seconds and 20 seconds when the metal disc is struck by a user.

In some embodiments, the percussion instrument further comprises at least one mallet. In another embodiment, the mallet is attached to the mounting base by a cable. In some embodiment, the mounting base comprises high-density polyethylene (HDPE), polyethylene high-density (PEHD), or metal. In another embodiment, the mounting base is a substantially flat panel comprising a plurality of through-holes. In yet another embodiment, the one or more fasteners comprises one or more bolts and one or more rubber spacers. In a further embodiment, the bolt is surrounded by the rubber spacer. In yet a further embodiment, the rubber spacer is neoprene. In a further embodiment, the percussion instrument comprises a plurality of rubber spacers having different lengths.

In some embodiments, the plurality of metal discs are positioned at a plurality of different heights above the mounting base. In another embodiment, the plurality of metal discs are positioned such that at least two metal discs overlap one another. In yet another embodiment, the plurality of metal discs are positioned at three or more different heights above the mounting base. In still another embodiment, the plurality of metal discs are arranged such that metal discs tuned to produce low pitched notes are positioned at a lower height than metal discs tuned to produce high pitched notes. In some embodiments, the plurality of metal discs is not arranged in the order of a musical scale.

In another embodiment, the support post is permanently attached to the ground or a playground surface. In some embodiments, an elastomeric bushing is between the metal disc and the fastener. In a further embodiment, the elastomeric bushing is supported by a spacer.

DETAILED DESCRIPTION OF THE INVENTION

Percussion instruments configured for outdoor installation are disclosed. These instruments may be near-perfectly tuned and make musical expression accessible to everyone, regardless of age, ability or musical training. The simplest of motor skills are needed to activate pure harmonies, providing enjoyment for all players. The percussion instruments are also configured to withstand various outdoor environments.

In one embodiment the percussion instrument comprises at least one metal disc, at least mounting base, and at least one support post.

Figure 1:
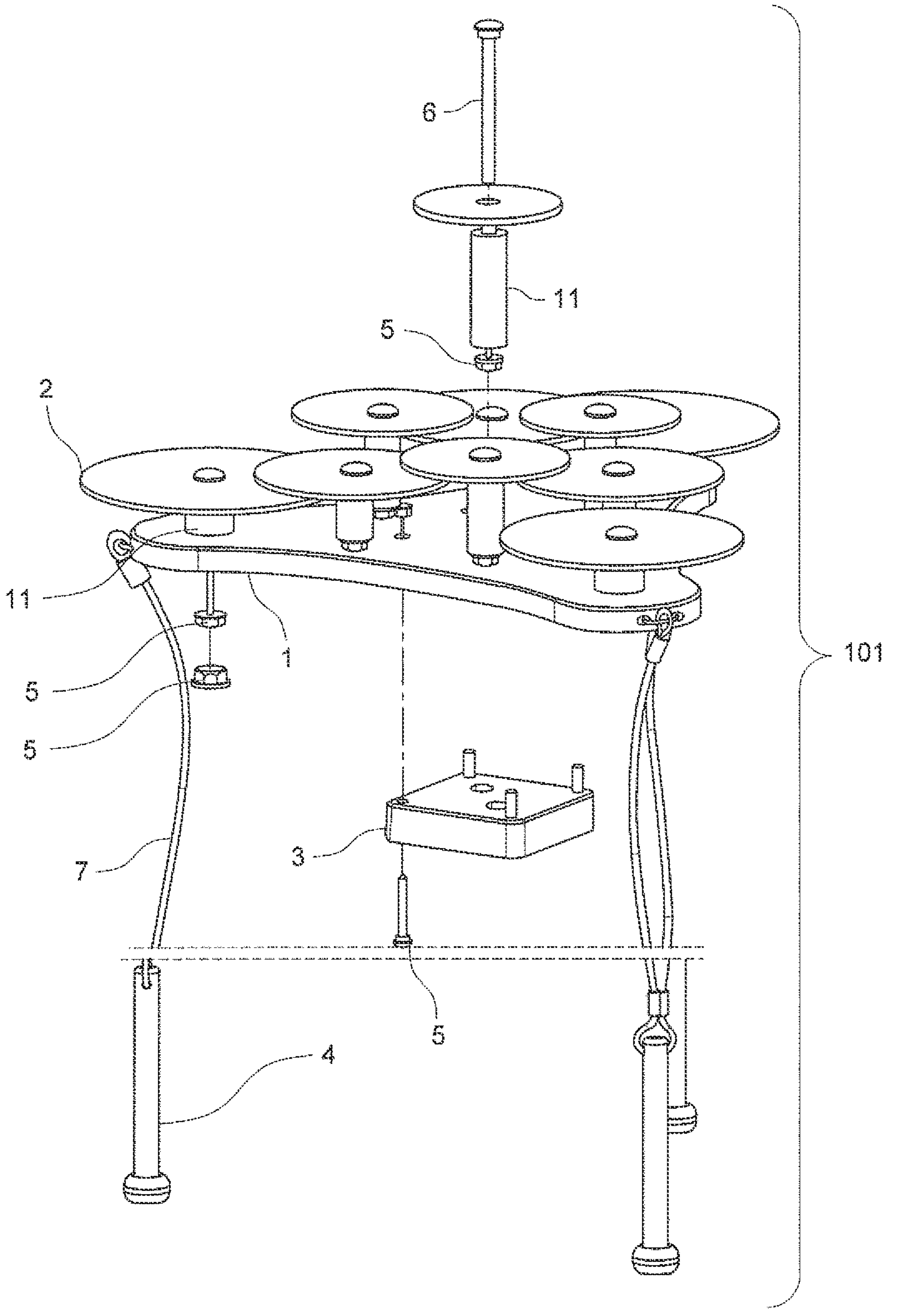
FIG. 1 depicts a percussion instrument in accordance with one embodiment of the invention.

FIG. 1 depicts a percussion instrument in accordance with one embodiment of the present disclosure. In the embodiment illustrated in FIG. 1, the percussion instrument 101 comprises ten metal discs 2, a mounting base 1, a support post 3, three mallets 4, various mounting fasters 5, 6, and various spacers or tubings 11, which surround the fasteners 6. In the illustrated embodiment, the mounting base 1 has a substantially triangular shape (though with rounded edges) and the metal discs 2 are arranged in a triangular format. However, in other, non-illustrated embodiments, the mounting base 1 may comprise different shapes and/or the metal discs 2 may be arranged in different formats to produce a different aesthetic.

Figure 2:
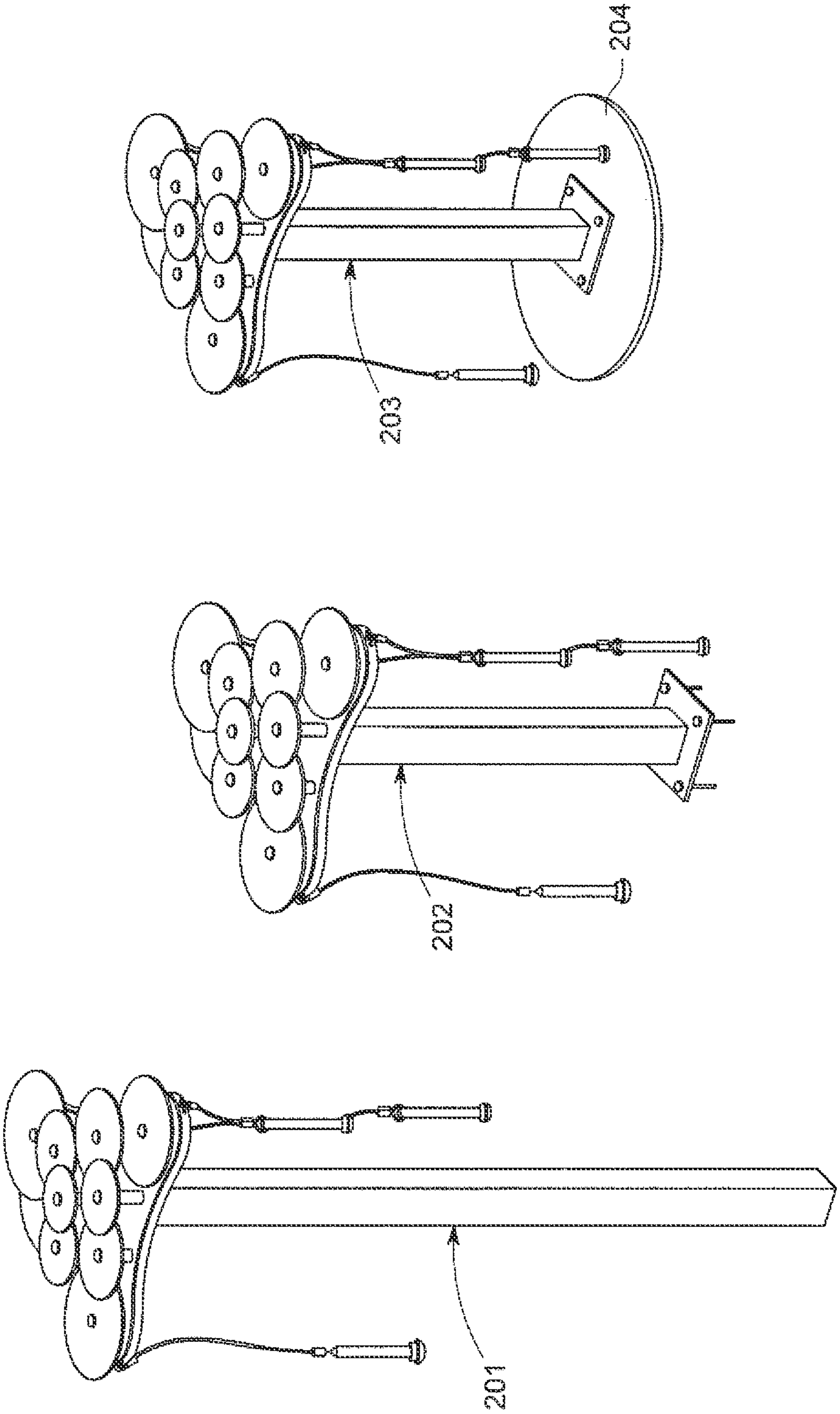
FIG. 2 depicts several embodiments of a percussion instrument.

Embodiments of the percussion instrument may be configured to be mounted to an outdoor surface in a number of manners, some of which are illustrated in FIG. 2. In some embodiments, the percussion instrument may be secured to an outdoor surface using an in-ground post 201. In some embodiments, the in-ground post 201 is placed in a hole and concrete is poured around the post. In another embodiment, the percussion instrument may be secured to an outdoor surface using a surface mount post 202. In some embodiments, the surface mount post 202 is secured to a concrete pad using fasteners, such as screws, bolts, or anchors. In another embodiment, the percussion instrument may be secured to an outdoor surface using a portable mount post 203. In some embodiments, the portable mount post 203 is attached to a portable stand 204 using fasteners, such as screws, bolts, or anchors.

In some embodiments, the metal discs 2 may be of the same or substantially the same shape but may have different sizes, e.g., different diameters. The different sizes of the metal discs 2 may provide for the production of different notes when struck by a user. In some embodiments, it may be desirable that the differences in size are relatively small compared to the overall size of the discs, such that the different discs have substantially similar appearances.

In some embodiments, the notes produced by the instrument may all be within the same musical scale. In some embodiments, for example, the notes produced by the percussion instrument may fall within a pentatonic scale. A pentatonic scale is a musical scale with five notes per octave. Because of its relative simplicity, this scale may be used to introduce beginners to music. It is also common in many types of traditional music. In some embodiments, the notes produced by the percussion instrument may fall within a heptatonic scale, which is the most common 7-note scale used in Western music. In other embodiments, the notes produced by the percussion instrument may be of a diatonic scale, a tritonic scale, a tetratonic scale, a hexatonic scale, octatonic scale, nonatonic scale, or a decatonic scale.

In some embodiments, the metal disc 2 may be prepared by cutting from a sheet of metal, e.g., sheet or anodized aluminum. For instance, the metal disc may be cut by sawing, shearing, or chiseling (all with manual and powered variants); torching with hand-held torches (such as oxy-fuel torches or plasma torches); or via computer numerical control (CNC) cuts (using a laser, mill bits, torch, or water jet).

In some embodiments, the metal disc 2 may be at least ¼ in thick. In some embodiments, the metal disc 2 has rounded perimeter edges. In a further embodiment, the rounded edges may be at least 1/16 in thick.

In yet another embodiment the metal disc 2 may have an outside diameter of at least 5 inches, alternatively at least 6 inches, alternatively at least 7 inches, alternatively at least 8 inches, alternatively at least 9 inches, or alternatively at least 10 inches.

In yet another embodiment the metal disc 2 has an inside diameter of at least 0.5 inches, alternatively at least 0.6 inches, alternatively at least 0.7 inches, or alternatively at least 0.8 inches.

In yet another embodiment, at least one hole is drilled in the metal disc 2, preferably near the center of the metal disc 2. In the embodiment depicted by FIG. 3, for example, there is one hole drilled near the center of the metal disc.

In some embodiments, the metal disc 2 may be an aluminum plate. Moreover, the surface of the aluminum plate may be anodized to provide corrosion resistance and/or a decorative finish.

In some embodiments, the metal disc 2 may be tuned by milling a rear surface of the metal disc. Milling is the process of cutting or scraping to remove material from a metal surface. This milling process allows for the ability to make minute adjustments to the thickness of the metal disc 2.

This milling process allows for accurate tuning of the percussion instrument. For instance, in order to increase the sharpness of the sound being produced, one may mill from the outer edge of the note-producing metal disc 2 toward the center of the note-producing metal disc. Alternatively, in order to increase the flatness of the sound being produced, one may mill from the center of the note-producing metal disc 2 toward the outer edge of the note-producing metal disc. Tuning of the instrument through milling may be accompanied and facilitated by the use of an electronic tuner or the like.

This milling allows for the production of very tonally accurate note-producing metal disc 2. In some embodiments, for instance, the percussion instruments may have a tonal note accuracy of at least 90%, preferably 95%, and more preferably 99%. Fine tune milling allows for the achievement of a precise musical note on the tonal scale, rather than the typical atonal chimes found in conventional outdoor instruments. Furthermore, the percussion instruments will maintain the tonal accuracy throughout its outdoor exposure.

In some embodiments, the percussion instrument may have at least 2 metal discs, alternatively at least 3 metal discs, alternatively at least 4 metal discs, alternatively at least 5 metal discs, alternatively at least 6 metal discs, alternatively at least 7 metal discs, alternatively at least 8 metal discs, alternatively at least 9 metal discs, or alternatively at least 10 metal discs. In some embodiments, for instance, the instrument may have between 2 and 12 metal discs, alternatively between 2 and 10 metal discs, alternatively between 4 and 12 metal discs, alternatively between 4 and 10 metal discs, alternatively between 5 and 12 metal discs, alternatively between 5 and 10 metal discs.

In some embodiments the metal discs 2 may be randomized on the mounting base 1, meaning that they are not arranged in the order of a musical scale. In other embodiments, the metal discs 2 may be arranged such that they are not in the order of a musical scale but may be at least somewhat ordered by increasing or decreasing pitch as described elsewhere herein. This encourages improvisation allowing for the user to engage with the percussion instrument in a variety of ways incorporating the users' creative thinking skills and concepts. In other embodiments, however, the metal discs 2 may be ordered as a musical scale (e.g., A-B-C-D-E-F-G) on the mounting base 1.

In some embodiments, the metal discs 2 may be positioned at a plurality of different heights above the mounting base. For instance, in some embodiments, the plurality of metal discs may be positioned at two or more different heights above the mounting base, alternatively at three or more different heights above the mounting base, alternatively at four or more different heights above the mounting base, alternatively at five or more different heights above the mounting base, alternatively at six or more different heights above the mounting base.

In some embodiments, for example, the higher pitched metal discs 2 may be placed at a greater height from the mounting base 1 and the lower pitched metal discs 2 may be placed at a lesser height from the mounting base 1. In this way, a user may know which metal discs 2 produce low notes and which metal discs produce high notes. Additionally, the low note-producing metal discs 2 may be larger, e.g., have a greater diameter, than the high note-producing metal discs. Therefore, placing the low note-producing metal discs at a lesser height than the high note-producing metal discs provides for and enhances the vertical stacking of metal discs, as shown in FIG. 1.

In some embodiments, for instance, the plurality of metal discs may be positioned such that at least two metal discs overlap one another vertically. For instance, the metal discs may be mounted on the mounting base in close proximity to one another such that the outer edge or portion of a metal disc positioned at a first height overlaps with the outer edge or portion of a metal disc positioned at a second height that is above or below the first height. In this way, a number of metal discs can be packed into a relatively small space, making it easy to move between and strike the different metal discs. It also provides for a relatively large number of metal discs within an instrument having a relatively small footprint.

The mounting base 1 may take on any number of configurations. In some embodiments, the mounting base 1 may be plastic. In other embodiments the mounting base 1 may be thermoplastic, including, but not limited to High-density polyethylene (HDPE), polyethylene high-density (PEHD), or metal. In some embodiments, the mounting base may be substantially flat. In some embodiments, the mounting base 1 is at least 1 in thick. In some embodiments, the mounting base 1 comprises at least one apertures for attaching the mounting base 1 to the support post 3, alternatively 2 apertures, alternatively 3 apertures, or alternatively 4 apertures. In yet another embodiment, the mounting base 1 comprises at least one apertures for attaching the metal discs 2 to the mounting base 1, alternatively at least 2 apertures, alternatively at least 3 apertures, alternatively at least 4 apertures, alternatively at least 5 apertures, alternatively at least 6 apertures, alternatively at least 7 apertures, alternatively at least 8 apertures, alternatively at least 9 apertures, or alternatively at least 10 apertures.

Figure 3:
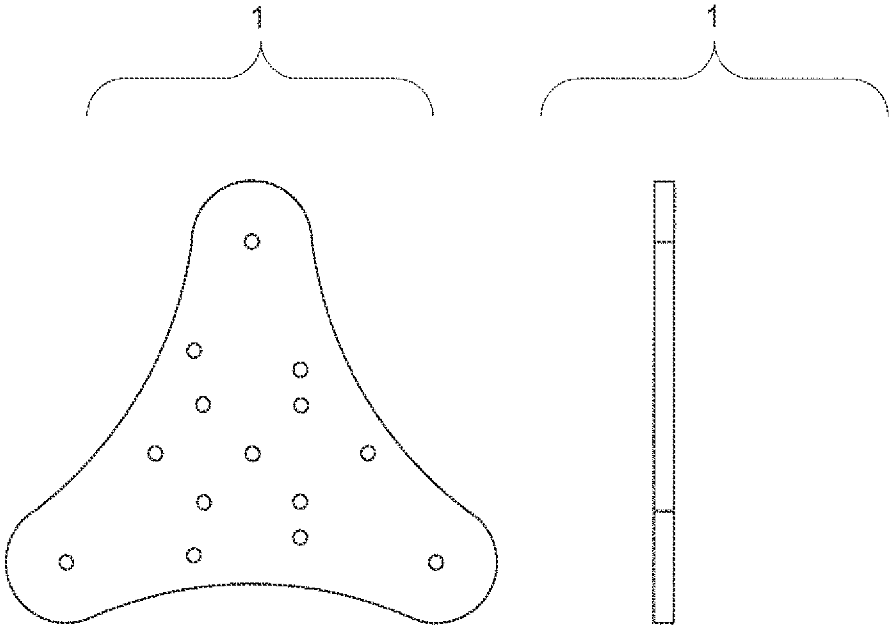
FIG. 3. depicts a mounting base in accordance with several embodiments of the invention.

The apertures may be spaced apart from one another by at least 3 inches, alternatively at least about 4 inches, alternatively at least about 5 inches. In some embodiments, the apertures may be substantially evenly distributed across the surface of the mounting base. In some embodiments, the apertures may be randomly distributed. An example of this embodiment is shown in FIG. 3. In other, non-illustrated embodiments, the apertures may be located only at a specific portion of the mounting base.

The number of apertures on the mounting base need not correspond to the number of metal discs secured to the mounting base. For instance, in some embodiments, although the mounting base illustrated in FIG. 3 comprises ten apertures for the mounting of metal discs, any number of metal discs may be mounted to the base. For instance, in some embodiments, the mounting base of FIG. 3 may only comprise seven metal discs or the like.

The metal discs 2 may be attached to the mounting base 1 using fasteners, such as carriage bolts 6, other types of bolts, screws, nuts, plugs, and the like. In some embodiments, the percussion instrument has an elastomeric bushing between the center of the metal disc 2 and the fastener, such as the carriage bolt 6. In some embodiments, a tubing 11 may surround the carriage bolt 6. In some embodiment the tubing 11 comprises a plastic polymer, including, but not limited to polyethylene, polypropylene, polyvinyl, or PVC. The tubing 11 may provide support to the elastomeric bushing and keeps the disc level when being struck by a user. In other embodiments, the tubing 11 may be made of an elastomeric or rubber material, and no additional elastomeric bushing may be needed.

Embodiments of the percussion instrument produce notes that are sustained for a relatively long period of time. In some embodiments, for example, the sounds can be sustained for at least 5 seconds, alternatively at least 10 seconds, alternatively at least 15 seconds, alternatively at least 20 seconds. In some embodiments, the elastomeric bushing and/or the tubing 11 may preserve the sustain of the sound by allowing the disc to vibrate freely at its fundamental pitch while resisting deflection during play.

Figure 4:
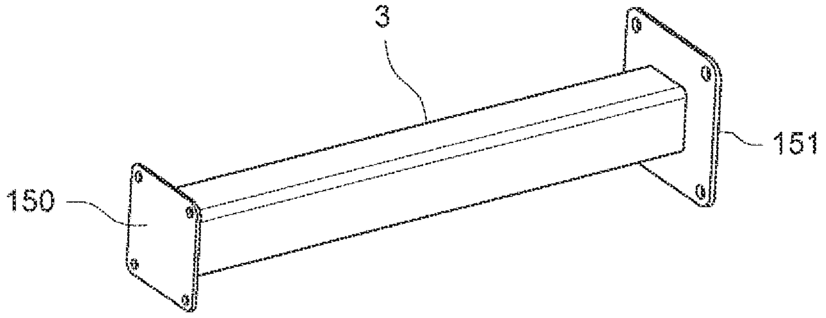
FIG. 4 depicts support posts in accordance with several embodiments of the invention.

The percussion instrument 2 may also comprise a support post 3. In some embodiments, such as the embodiments illustrated in FIG. 4, the support post 3 may comprise an upper mounting plate 150, to which the mounting base 1 may be mounted. In some embodiments, the support post 3 also comprises a base plate 151. In some embodiments, the support post 3 may be metal, including, but not limited to, steel. In some embodiments, for example, the support post 3 may comprise a galvanized steel pipe.

In some embodiments, the support 3 post may extend vertically from the ground or playground surface to which it is installed, thereby placing the mounting base 1 with one or more metal discs 2 at a desired elevation for striking by users of varying heights.

In some embodiments, the support post 3 may have a portable stand 204. In another embodiment, the support post 3 may have a nameplate.

In some embodiments, mounting plate 150 may comprise one or more apertures. The one or more apertures may be configured for attachment of the support post 3 to the mounting base 1 using one or more fasteners. In some embodiments, the mounting plate 150 may be permanently connected to the support post 3, such as through welding.

In some embodiments, the base plate 151 may comprise one or more apertures. The one or more apertures allow for attachment of the support post 3 to an outdoor surface including, but not limited to, the ground or composite materials such as concrete or another surfacing, including playground surfacing. In some embodiments, the support post 3 may be attached semi-permanently to the ground or a secondary surface. In yet another embodiment the support post 3 may be attached permanently to the ground or a secondary surface. This attachment allows for the percussion instrument to withstand the outdoor environment and protects the instrument from theft or vandalism.

The percussion instrument 101 may also comprise one or more mallets 4. In some embodiments, each mallet may be attached to the mounting base 1 or support post 3, such as through a cable 7. The cable 7 may be either a retractable cable or a non-retractable cable. In some embodiments, the cable is made from steel. In yet another embodiment, one or more mallets may be attached to an additional structure, such as a mallet-support structure. In some embodiments, the mallet(s) may be attached to the instrument or to the mallet-support structure through a tamper-resistance connection in order to protect against the removal of the mallet(s).

In some embodiments, the mounting base 1 and/or the support post 3 may comprise one or more mallet cradles configured to hold the mallet(s) 4 when not in use.

In some embodiments, the head of the mallet 4 may be plastic. For example, in some embodiments, the head of the mallet 4 may be polyurethane. In some embodiments, the head of the mallet 4 may have a durometer between about 60 and about 80, alternatively between about 65 and about 75. In some embodiments, the head of the mallet 4 may have a durometer of about 70.

In some embodiments, the instrument may also be configured to enhance music education. For instance, in some embodiments, each note may be clearly identified on the instrument. For example, one or more of the metal discs may comprise a marking, such as an inscription on the metal disc, indicating the note that is played upon striking the disc. In some embodiments, the instrument may also contain notes from multiple scales. In addition to fun musical exploration, this may provide education about various musical scales.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which is obvious to those skilled in the art are intended to be within the scope of the following claims.

What is claimed is:

1. An outdoor musical instrument comprising:

a support post mounted to and extending from an outdoor surface;

a base secured to the support post; and a plurality of metal discs secured to the base, each of the plurality of metal discs being configured to produce a musical note when struck by a user;

wherein the plurality of metal discs are configured to produce musical notes within the same musical scale;

wherein the plurality of metal discs are not arranged in the order of the musical scale;

wherein the base is a substantially flat panel having an upper surface that is substantially parallel with the outdoor surface and which is defined by three or more sides of a substantially same length; and wherein the plurality of metal discs are positioned across substantially the entire upper surface of the base.

2. The outdoor musical instrument of claim 1, wherein the metal discs are positioned at a plurality of different heights above the upper surface of the base.

3. The outdoor musical instrument of claim 2, wherein at least two of the plurality of metal discs positioned at different heights overlap one another.

4. The outdoor musical instrument of claim 2, wherein the metal discs are positioned at three or more different heights above the mounting base.

5. The outdoor musical instrument of claim 2, wherein the plurality of metal discs are arranged such that metal discs configured to produce relatively low pitched notes are positioned at a lower height than metal discs configured to produce relatively high pitched notes.

6. The outdoor musical instrument of claim 2, wherein at least two of the metal discs have different diameters.

7. The outdoor musical instrument of claim 1, wherein the base is substantially triangular in shape.

8. The outdoor musical instrument of claim 1, wherein each of the plurality of metal discs is secured to the base by a fastener.

9. The outdoor musical instrument of claim 8, further comprising one or more bushings positioned between at least one of the plurality of metal discs and the fastener.

10. The outdoor musical instrument of claim 8, further comprising one or more support tubes, each of which surrounds at least a portion of the fastener between the base and one of the plurality of metal discs.

11. An outdoor musical instrument comprising:

a support post mounted to and extending from an outdoor surface;

a base secured to the support post;

a plurality of metal discs secured to the base, each of the plurality of metal discs being configured to produce a musical note when struck by a user, each of the plurality of metal discs being secured to the base by a fastener; and a plurality of support tubes, each of which surrounds at least a portion of the fastener between the base and one of the plurality of metal discs and wherein each support tube is made of an elastomeric or rubber material.

12. The outdoor musical instrument of claim 8, wherein the fastener comprises a bolt that passes through an aperture in the metal disc and an aperture in the base.

13. The outdoor musical instrument of claim 8, wherein the instrument is configured so that each of the fasteners may be tensioned independently from each of the other fasteners.

14. The outdoor musical instrument of claim 1, further comprising one or more mallets, each of the one or more mallets being attached to one or more of the base and the support post by a cable.

15. The outdoor musical instrument of claim 1, further comprising a plurality of mallets, each of the plurality of mallets being attached to one or more of the base and the support post by a cable, and wherein at least one of the plurality of mallets is located at each side or at each corner of the base.

16. The outdoor musical instrument of claim 1, wherein each metal disc comprises aluminum.

17. The outdoor musical instrument of claim 11, wherein the base has an upper surface that is substantially parallel with the outdoor surface, wherein the metal discs are positioned at a plurality of different heights above the upper surface of the base, and wherein the plurality of support tubes comprises at least two support tubes having different lengths.

18. The outdoor musical instrument of claim 17, wherein the plurality of metal discs are arranged such that metal discs configured to produce relatively low pitched notes are positioned at a lower height than metal discs configured to produce relatively high pitched notes.

19. The outdoor musical instrument of claim 11, wherein the fastener comprises a bolt that passes through an aperture in the metal disc and an aperture in the base.

20. The outdoor musical instrument of claim 11, wherein the instrument is configured so that each of the fasteners may be tensioned independently from each of the other fasteners.

* * * * *